(12) United States Patent
Mullen

(10) Patent No.: US 7,895,032 B2
(45) Date of Patent: Feb. 22, 2011

(54) SYSTEM AND METHOD TO MODIFY TEXT ENTRY

(75) Inventor: Paul Lawrence Mullen, Waukesha, WI (US)

(73) Assignee: General Electric Company, Schenectady, NY (US)

( * ) Notice: Subject to any disclaimer, the term of this patent is extended or adjusted under 35 U.S.C. 154(b) by 911 days.

(21) Appl. No.: 11/810,494

(22) Filed: Jun. 6, 2007

(65) Prior Publication Data

US 2008/0306730 A1      Dec. 11, 2008

(51) Int. Cl.
  *G06F 17/27* (2006.01)
(52) U.S. Cl. ............ 704/9; 704/4; 704/7; 704/257
(58) Field of Classification Search .......... 704/260, 704/10, 1, 4, 7, 9, 257; 715/261; 709/247
  See application file for complete search history.

(56) References Cited

U.S. PATENT DOCUMENTS

| | | | |
|---|---|---|---|
| 5,634,084 A * | 5/1997 | Malsheen et al. ........... 704/260 |
| 6,934,767 B1 * | 8/2005 | Jellinek ..................... 709/247 |
| 7,503,001 B1 * | 3/2009 | Lekutai ...................... 715/261 |
| 7,536,297 B2 * | 5/2009 | Byrd et al. .................. 704/10 |

OTHER PUBLICATIONS

"USPS Find A Zip Code Form", http://zip4.usps.com/zip4/welcome.jsp, Feb. 1, 2007.
Dewitt, Clinton; "T9 Synonyms", http://blog.unto.net/work/T9, Jan. 28, 2005.

* cited by examiner

*Primary Examiner*—Huyen X. Vo
(74) *Attorney, Agent, or Firm*—Fletcher Yoder

(57) ABSTRACT

A system and method to modify entry of text is provided. The system includes an input device, a display device, and a processor configured to store a correlation between at least one word with at least one candidate phrase; receive at least one word into the input device; identify the at least one candidate phrase correlated to the at least one word; replace the at least one word with a selected phrase from the at least one candidate phrase; and store the selected phrase in a computer readable storage medium.

17 Claims, 3 Drawing Sheets

US 7,895,032 B2

SYSTEM AND METHOD TO MODIFY TEXT ENTRY

BACKGROUND OF THE SUBJECT MATTER

The invention relates generally to data input devices, such as those used to input text or other data in computers or other electronic devices. More specifically, this invention relates to a method of selecting and standardizing phrases based on words entered by a user into the input device.

Typical known electronic devices or equipment that accept and/or require interaction with or data from an operator use input devices such as an alphanumeric keyboard. Examples of limited input devices include a voice recognition system, a telephone keypad, or a stylus, depending on the form of the electronic device. For example, cellular phones commonly use telephone keypads, while personal data assistants (PDA's) typically rely on a stylus. Both examples of input devices have limited input capabilities when compared to a full keyboard. The various interfaces among these different input devices may present challenges to users when learning or operating a new electronic device.

In some contexts, such as the healthcare industry, installers or service engineers are required to document work performed to assemble, install, adjust, service and/or test medical or healthcare equipment. The installers or engineers may use an electronic device, particularly a portable electronic device such as a PDA, to record and store the data describing or documenting the work performed. While the small form factor of such electronic devices may offer portability, long battery life, and other advantages, the data input interfaces of such certain known devices include drawbacks. For example, installers or engineers may have to learn a different interface to enter data, or may commit more mistakes as compared to entering data with an alphanumeric keyboard. Further, the data entered by the installer or engineer may be part of a permanent record and auditable by outside agencies or companies. Additionally, the data entered by the installer or engineer may be presented to or viewable by the customer using or owning the equipment being serviced.

Several additional challenges may confront the installer or engineer required to document work performed during a service call. For example, the input device employed by a PDA, such as a stylus, may limit the speed and detail of the data entered by the installer or engineer, and is further complicated by the learning curve associated with the limited input device. Any data, such as text, may therefore have grammatical, spelling, or clarity errors, and may not present accurate or readable text suitable for viewing by a customer. In another example, there is increased likelihood of difficulty in standardizing words or phrases detailing the work performed using these certain known devices.

BRIEF DESCRIPTION OF THE SUBJECT MATTER

There is a need for a system and method that addresses one or more of the challenges, drawbacks or needs described above. A method and system are provided to modify an entry of text to be stored in a computer-readable storage medium. According to one embodiment, a method includes: storing a correlation between at least one word with at least one candidate phrase; receiving the at least one word into an input device; identifying the at least one candidate phrase correlated to the at least one word; replacing the at least one word with a selected phrase from the at least one candidate phrase; and storing the candidate phrase in the computer-storage medium.

According to another embodiment, a system includes: an input device, a display device, and a processor. The processor is configured to: store a correlation between at least one word with at least one candidate phrase; receive at least one word into the input device; identify the at least one candidate phrase correlated to the at least one word; replace the at least one word with a selected phrase from the at least one candidate phrase; and store the selected phrase in a computer readable storage medium.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE SUBJECT MATTER

Figure 1:
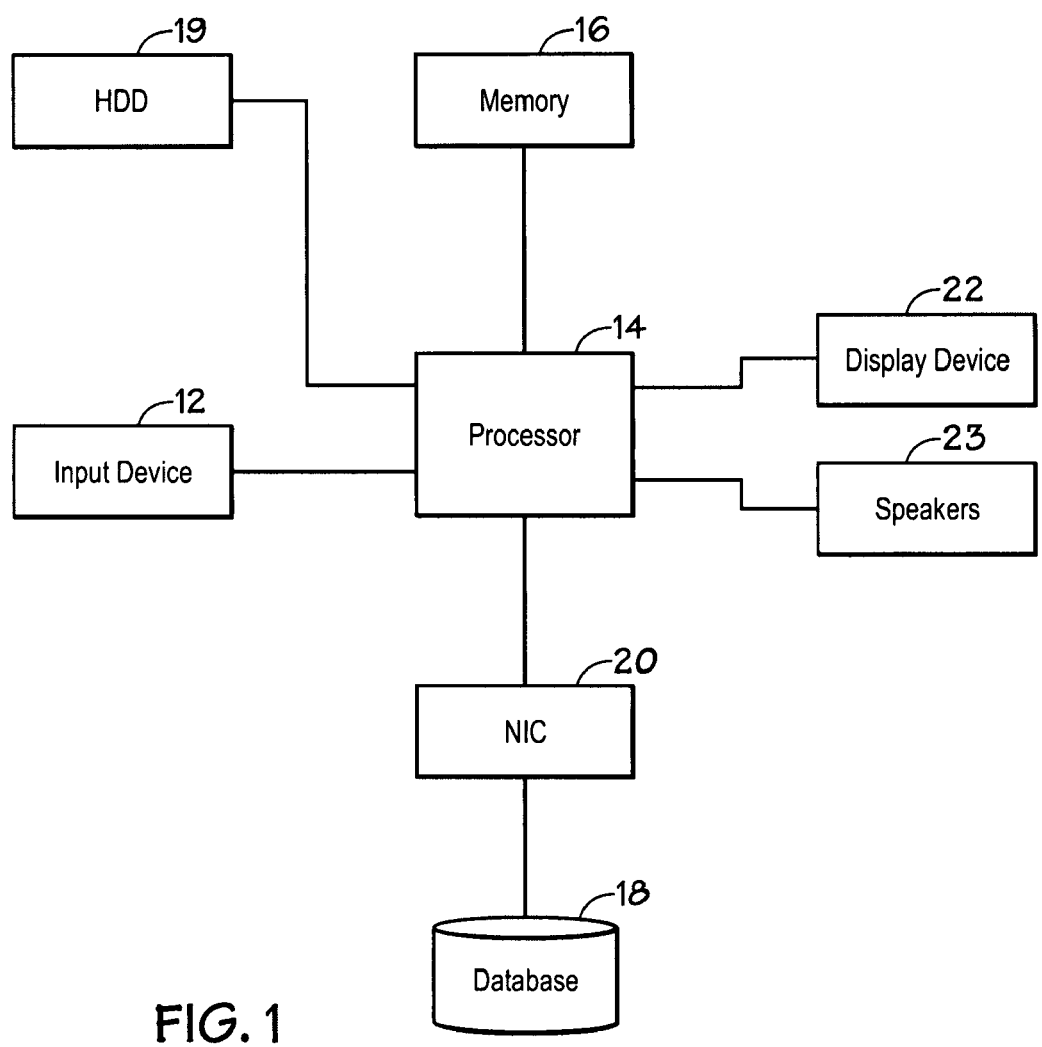
FIG. 1 illustrates a block diagram of a computer system in accordance with an exemplary embodiment of the present invention.

FIG. 1 illustrates a block diagram of an embodiment of a system 10. It should be understood that the system 10 may include additional components as needed for a specific application. The system 10 includes an input device 12 configured to provide input to a processor 14. The input device 12 may be an alphanumeric keyboard, telephone keypad, stylus, voice recognition system, or any other known input device suitable for allowing a user to enter or input data to the device. The input device 12 may confront the user with any or all of the challenges described above with regard to input speed, accuracy, detail, clarity, and ease of use.

The processor 14 may be connected to various computer-readable storage media, such as a memory 16 or a hard disk drive (HDD) 19, and may also be connected to a database 18. The memory 16 may be a RAM, ROM, or any other memory type configured to be accessible to the processor 14. The memory 16 may store the algorithms configured to execute the exemplary acts of the present technique. In addition, the one or more words, selected phrases, user information, customer information, and any other data or information used or needed by the system 10 and processor 14 may be stored in the memory 16 and/or the database 18. The database 18 may be a physical part of the computer system 10, i.e. it may be stored on a hard disk drive 19 which may be connected to the processor 14 through the use of a suitable known interface (e.g., parallel or serial ATA, SCSI, USB). Alternatively, the database 18 may be logically connected to the system 10, such as through a network accessible to the system 10 through a network interface device (NIC) 20. Examples of the network include an Ethernet network or wireless Ethernet network.

The processor 14 is also connected in communication to a display device 22. The display device 22 may include an LCD, an SED display, a CRT display, a DLP display, a plasma display, an OLED display, LED display, a mobile phone display, a pager, a hand-held personal data assistant (PDA) (e.g., PALM®, etc.), and/or any other type of display operable to generate an illustration for view by the user. The display device 22 provides a display for a user to view any entered data or text, and for the processor 14 to present the selected phrases to the user. The display device 22 may also display any notifications to a user, such as prompting the user for more information. As will be appreciated by those of ordinary skill in the art, though a display device 22 is depicted in the exemplary embodiment, in other embodiments the display device 22 may be supplemented or replaced by an audio device, such as one or more speakers 23, that allow a user to audibly review entered data and/or selected phrases and to hear audible notifications or prompts.

Figure 2:
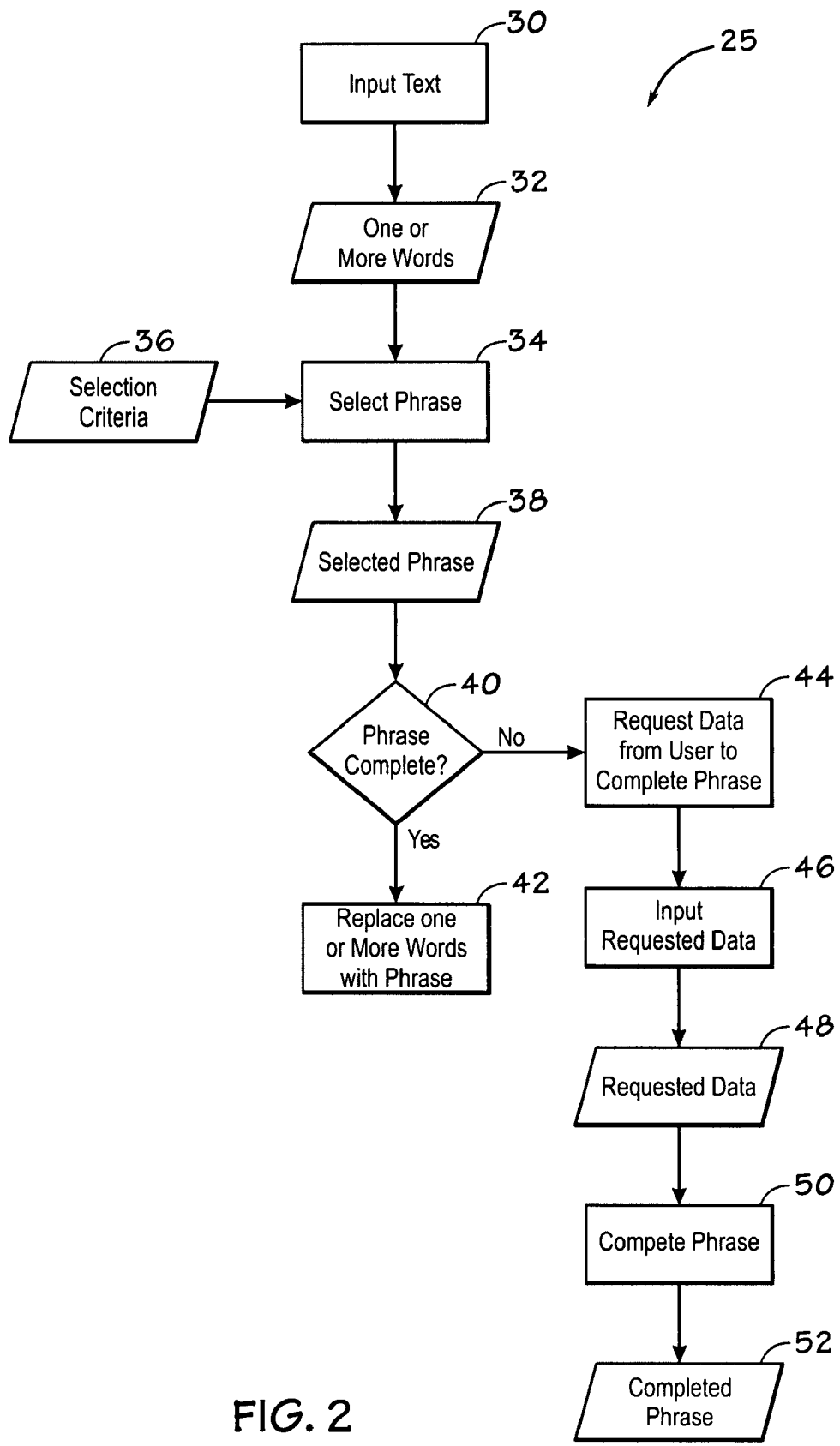
FIG. 2 is a flowchart depicting exemplary actions for modifying text entered by a user in accordance with an embodiment of the present technique.

FIG. 2 illustrates an embodiment of a method 25 comprising acts to modify text entered by a user. A user, such as an installer or service engineer, inputs text or data related to a service call or other equipment and/or customer related incident (block 30). As discussed above, the text or data may be entered through various types of input devices, including an alphanumeric keyboard, telephone keypad, stylus, or voice recognition system. The data entered may be a document of the work performed or the diagnosis made by the installer or engineer, and may include information specific to the nature of the work performed, the customer, or the user. The user may enter one word or any number of words, and the words themselves may be abbreviated, may be incorrectly spelled or entered words, or may be arranged in a different sequence(s) with respect to one another (for example, "bulb broke" or "broke bulb"). Once the user has entered one or more words (block 32), a phrase is selected based on the one or more words (block 34).

A phrase is selected based on one or more text (e.g., words) entered by a user via the input device, and the selected phrase replaces the one or more entered text. The term phrase refers to one or more words that form an expression, idea, or meaningful unit. The phrase need not be a sentence, but may be a sentence fragment without a subject and/or predicate, and may be one word, a sentence fragment, a sentence, a paragraph, up to any number of words. Once a phrase is selected, a notification may be provided to a user as a prompt to enter more words or confirm the selection of a phrase. Further, the selection criteria for the selected phrase may be based on any one of or combination of the following factors: information about the user, such the identity or certification level of the user; a customer identity; the type of equipment being serviced; the type of the service call; and/or the time of day. Additionally, in some embodiments multiple selected phrases based on the one or more words entered by the user may be presented to the user for indication of a phrase. Further, the phrases may be stored in a database and prioritized based on various criteria, including the number of times a user and/or multiple users have selected a phrase.

As discussed above, the selected phrase (block 38) may be a word, sentence fragment, sentence, or paragraph, and may include more words or less words than the words being replaced. For example, a user may input the words: "Changed input amp." The phrase selected based on those words may be: "Changed calibration of input amplifier using procedure 46-77."

Additional selection criteria may optionally be used in phrase selection (block 36) and any one of or combination of these criteria and the one or more words may be used in phrase selection. According to one embodiment, the phrase selected may be based on the information about the user entering the phrase into the input device. The user may be an installer, a technician, a service engineer, or any employee, contractor, or non-employee. For example, the availability of stored phrases to select from may be limited to one or more words previously entered and correlated to a user's certification or identity. If a user is certified to work on device A, but not device B, selection of phrases or entry by the user of phrases that are unique to device B may not be allowed. Such a restriction minimizes unauthorized or irrelevant text or data entries and facilitates selection of the proper phrase based upon the entered word or words. In another example, the user's identity may be used during phrase selection in conjunction with the one or more words entered. For example, if the user's name is John Smith, the selected phrase may be: "'John Smith' changed calibration of input amplifier using procedure 46-77" (emphasis added). By using specific information such as a user's certification or identity to customize or limit the list of phrases to select from, the speed of entry, accuracy and clarity of information may be improved.

Additional criteria, such as the identity of the customer, the nature of the service call, and/or the time of day may also be used in phrase selection. For example, some customers may have different service plans or contracts for service or maintenance performed by the installer or engineer. If the user enters "Replaced free," the selected phrase that replaces the entered words may be: "The part was replaced at no additional charge"; or "The part was replaced under warranty." The selected phrase in such an embodiment may depend on the customer's contract or service plan with the equipment provider.

Likewise, the identity of the customer or information about the nature of the service call may be utilized in phrase selection. For example, a customer identity that is only associated with equipment A, such as computed tomography (CT) imaging systems, will not lead to the selection of phrases associated with other types of equipment. In this example, an entry of "service detector" may lead to the selection of the phrase "serviced CT detector assembly" but not to the selection of the phrase "serviced mammography detector assembly". Similarly, a pre-coded service call for a CT system might preclude non CT phrases from being selected in response to the one or more entered words.

The time of day may also be used, as equipment providers or customers may also prefer the time of day to be a part of the selected phrase. The time of day may also be used in limiting phrase selection based on the customer's service plan or contract. For example, if the user enters "Replaced free" on a service call during a contractually defined service interval such as 8:00 am to 5:00 pm, the selected phrase may be: "The part was replaced under warranty." However, if the user enters "Replaced free" during a service call outside a contractually defined service interval, such as a service call occurring at midnight, the selected phrase may be: "The part was replaced under invoice #[XXXX]" where X represents an alpha-numeric symbol or text representative of an identity of the invoice.

The selected phrase (block 38) may be a complete phrase, or the selected phrase (block 38) may be a partial phrase requiring further user input for completion. Accordingly, the selected phrase is checked for completeness (block 40). If the selected phrase is complete, a phrase is selected based on the one or more words and any of the criteria described above and the one or more words are then replaced by the phrase (block 42). Replacing the one or more words with a selected phrase allows input of natural language that may be easier to employ for a user unaccustomed to the limitations of the input device. In addition, by replacing the one or more words with selected phrases, data may be recorded faster than literal word-byword entry, i.e., one or a limited number of words may be replaced with a greater number of words, one or more complete sentences, or a paragraph. Further, phrase standardization may also allow control over grammar, spelling, word usage, and sentence construction as desired when the recorded data or text will be viewed by a customer or auditing agency.

If the selected phrase is not complete, data may be requested from the user to complete the phrase (block 44). The user may input the requested text or data to complete the selected phrase (block 46). For example, the user may enter the one or more words: "Changed input amp." The phrase selected based on these one or more words may be: "Changed calibration of input amplifier using procedure no. [blank]" where the user is prompted to enter the procedure number. The requested data (block 48) is used to complete the selected phrase (block 50). The completed phrase (block 52) is then checked again for completeness (block 40). If the phrase is now complete, the one or more words are replaced with the phrase (block 42).

Figure 3:
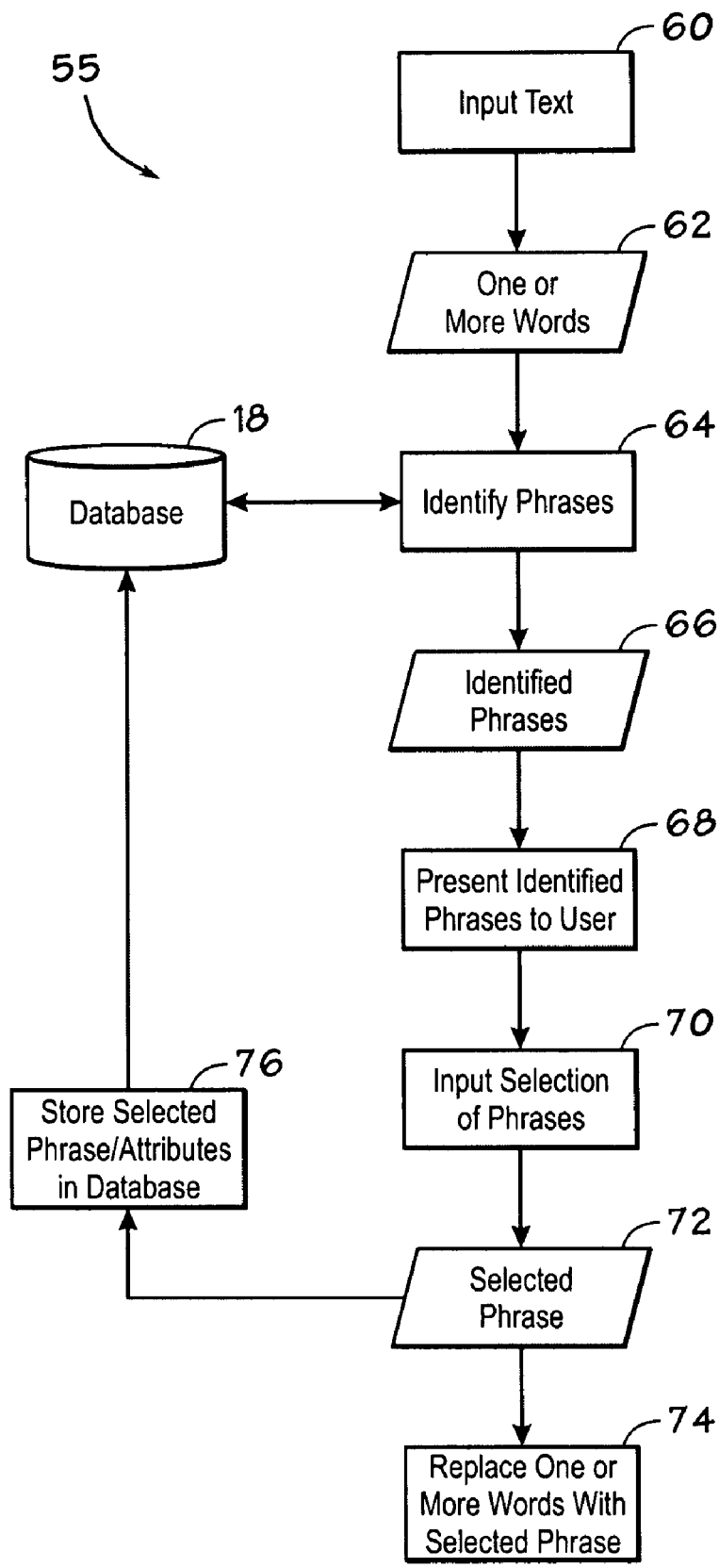
FIG. 3 is a flowchart depicting alternative exemplary actions for modifying text entered by a user in accordance with an alternative embodiment of the present technique.

FIG. 3 illustrates an embodiment of a method 55 comprising acts to modify text entered by a user. A user, such as a technician, installer, service engineer, employee, contractor, or non-employee may input text related to a service call or other equipment and/or customer related incident (block 60). As stated above, the user may enter one word or any number of words, and the words themselves may be abbreviated, misspelled, or mis-entered words or may be ordered in different ordered relations to one another. Once the user has entered one or more words (block 62), a phrase is identified based on the one or more words (block 64). The phrase may be identified from a database 18 accessible to the embodiment implementing the exemplary acts or steps described herein. For example, the database 18 may be on a logical or physical network accessible to the process as described above.

The phrases stored in the database 18 may be adaptively prioritized or promoted/demoted in a list stored in the memory 16. For example, the system 10 may present or illustrate one or more identified candidate phrases (block 66) to replace the one or more words entered by the user (block 68). Accordingly, the candidate phrases may be correlated with stored information of a count of a number of times that a user has or multiple users have previously selected each of the candidate phrases, as measured or calculated by the system 10. This count information may be illustrated in correlation with candidate phrases to be displayed for viewing by the user that has been identified or selected in correlation with the user's entry of one or more words to the system 10. If the database 18 is on a network, multiple computer systems may have access to the same database 18. In this embodiment, the system 10 compares and prioritizes or promotes or demotes selection phrases relative to other candidate phrases dependent on a measured or calculated frequency of the multiple users' selection of the candidates phrase over a pre-described time. For example, a user may enter the one or more words: "Replaced free." The database 18 may store two phrases, phrase one and phrase two, used to replace the words "Replaced free." However, if a user has previously selected phrase one about 15 times, while in comparison, the user has previously selected phrase two only about 5 times, then the phrase one will be assigned priority to be initially identified and presented to the user before phrase two. Such phrase prioritization may advantageously increase the data or text input speed, as the user may learn which phrase will be prioritized and presented first, and therefore make the selection without pausing to consider other less preferred or frequently used phrases.

Alternatively, the phrases stored in the database may be adaptively prioritized or promoted/demoted according to a preset or manual prioritization scheme. For example, through the use of database management software or another interface to the database, such as a "phrase management tool" developed for such an application, phrases can be promoted and/or demoted based on specific prioritization, such as management preference or other "best practices" as may be established by the individuals or institutions overseeing the service program. Promotion of a specific phrase over other phrases might suggest selection and/or use of that phrase even if it is not the most frequently used phrase. For example, a user may enter: "Replaced free." The selected phrases presented to the user may then be: "The part was replaced free of charge"; "The part was replaced at no additional charge"; and "Replaced the free-floating tabletop." If management practice is to prefer the phrase "The part was replaced free of charge," this phrase may be promoted over the other phrases and therefore presented to the user as the first identified phrase in priority in comparison to other phrases.

Once the one or more phrases are presented to the user, the user may select a phrase from the one or more phrases (block 70) which corresponds to the intended meaning of the one or more words initially entered. The selected phrase (block 72) selected by the user replaces the one or more words originally entered by the user (block 74). Additionally, the selected phrase (72) or information about the selected phrase may be stored in the database 18 (block 76). For example, as discussed above, in some embodiments phrase promotion/demotion or prioritization may be based on a count of the number of times a phrase is selected by a specific user. In such an embodiment, each time the user selects a specific phrase from the list of identified phrases that selection may be added to the count of number of times the user has selected that phrase and stored in the database. In this manner, each time the user selects a phrase, the adaptive prioritization or promotion/demotion described above may be maintained.

A technical effect of the above-described subject matter is to provide a system and method to provide to record and store phrases in a computer-readable storage medium dependent on entry of words or other natural language or alpha-numeric symbols. The above-described system 10 and methods 25 and 55 include calculating and assigning adaptive prioritization to certain phrases relative to others based on one or more of: a measured or historical use of words or phrases, identified or predetermined correlation with groups of word usage, a predetermined management decision, and an identified role or certification of the current user as stored in or identified by the system 10. The above described embodiments of the system 10 and phrase selection techniques or methods 25 and 55 as illustrated in FIGS. 2 and 3 may be used in any combination or configuration thereof depending on the specific implementation of the exemplary acts. For example, a database may used to store phrases, user information and customer information, and phrase selection may be based on all these criteria in conjunction with the one or more words entered by the user.

While only certain features of the subject matter have been illustrated and described herein, many modifications and changes will occur to those skilled in the art. It is, therefore, to be understood that the appended claims are intended to cover all such modifications and changes as fall within the true spirit of the subject matter described herein.

The invention claimed is:

1. A method to modify an entry of text to be stored in a non-transitory computer readable storage medium, comprising:

storing a correlation between at least one word with at least one candidate phrase, wherein the at least one candidate phrase includes a first candidate phrase and a second candidate phrase different than the first candidate phrase;

receiving at least one word into an input device of a processor-based system;

identifying the at least one candidate phrase correlated to the at least one word using a processor of the processor-based system;

replacing the at least one word with a selected phrase from the at least one candidate phrase using a processor of the processor-based system;

storing the candidate phrase in the non-transitory readable storage medium;

measuring a number of times that each of the first and second candidate phrases is selected in the replacing step over a period of time; and correlating and storing the number of times that each first and second candidate phrase is selected with the respective first and second candidate phrase.

2. The method of claim 1, the method further including:

comparing the number of times that each of the first and second candidate phrases is selected with one another; and displaying the first and second candidate phrases simultaneously with the respective number of times selected.

3. The method of claim 1, the method further including:

calculating a priority of the first and second candidate phrases relative to one another dependent upon the number of times of selected; and displaying the first and second candidate phrases in a sequence in accordance with the priority.

4. The method of claim 1, wherein the selected phrase includes a display prompt for illustration to the user to enter additional information via the input device to be stored with the selected phrase.

5. The method of claim 1, wherein the selected phrase is automatically stored with one of the group comprising: a customer identity, a time of day, a user identity, a service call type, and an equipment name.

6. A method to modify an entry of text to be stored in a non-transitory computer readable storage medium, comprising:

storing a correlation between at least one word with at least one candidate phrase, wherein the at least one candidate phrase includes a first candidate phrase and a second candidate phrase different than the first candidate phrase;

receiving at least one word into an input device of a processor-based system;

identifying the at least one candidate phrase correlated to the at least one word using a processor of the processor-based system;

replacing the at least one word with a selected phrase from the at least one candidate phrase using a processor of the processor-based system;

storing the candidate phrase in the non-transitory readable storage medium;

receiving and storing a predetermined priority of the first and second candidate phrases relative to one another prior to receiving the step of receiving the at least one word into the input device; and displaying the first and second candidate phrases in a sequence in accordance with the predetermined priority.

7. A method to modify an entry of text to be stored in a non-transitory computer readable storage medium, comprising:

storing a correlation between at least one word with at least one candidate phrase, wherein the at least one candidate phrase includes a first plurality of candidate phrases and a second plurality of candidate phrases different than the first plurality of candidate phrases;

receiving at least one word into an input device of a processor-based system;

identifying the at least one candidate phrase correlated to the at least one word using a processor of the processor-based system;

replacing the at least one word with a selected phrase from the at least one candidate phrase using a processor of the processor-based system;

storing the candidate phrase in the non-transitory readable storage medium;

storing one of the first and second plurality of candidate phrases in correlation to each of a list of potential user identifications;

receiving the identification of the user;

comparing the identification of the user to the list of potential user identifications;

identifying one of the first and second plurality of candidate phrases correlated to the identification of the user; and displaying one of the first and second plurality of candidate phrases correlated to the identification of the user.

8. The method of claim 7, wherein the identification of the user includes one of group comprising: an employee identification, an employee certification, a customer identification, and a representation of a nature of a service call.

9. A system to modify entry of text to be stored in a computer-readable storage medium, comprising:

an input device;

a display device connected to the input device; and a processor connected to the input device and display device and memory, wherein the processor is configured to execute a plurality of programmable instructions stored in the memory, the processor in combination with the plurality of programmable instructions in the memory operable to:

store a correlation between at least one word with at least one candidate phrase, wherein the at least one candidate phrase includes a first candidate phrase and a second candidate phrase different than the first candidate phrase;

receive at least one word into the input device;

identify the at least one candidate phrase correlated to the at least one word;

replace the at least one word with a selected phrase from the at least one candidate phrase;

store the selected phrase in a computer readable storage medium;

measure a number of times that each of the first and second candidate phrases is selected in the replacing step over a period of time; and correlate and store the number of times that each first and second candidate phrase is selected with the respective first and second candidate phrase.

10. The system of claim 9, the processor in combination with the plurality of programmable instruction in the memory further operable to:

compare the number of times that each of the first and second candidate phrases is selected with one another; and display the first and second candidate phrases simultaneously with the respective number of times selected.

11. The system of claim 9, the processor in combination with the plurality of of programmable instruction in the memory further operable to:
  calculating a priority of the first and second candidate phrases relative to one another dependent upon the number of times of selected; and
  displaying the first and second candidate phrases in a sequence in accordance with the priority.

12. The system of claim 9, wherein the selected phrase includes a prompt for display to the user to enter additional information via the input device to be stored with the selected phrase.

13. The system of claim 9, wherein the selected phrase is automatically stored with one of the group comprising: a customer identity, a time of day, a user identity, a service call type, and an equipment name.

14. A system to modify entry of text to be stored in a computer-readable storage medium, comprising:
  an input device;
  a display device connected to the input device; and
  a processor connected to the input device and display device and memory, wherein the processor is configured to execute a plurality of programmable instructions stored in the memory, the processor in combination with the plurality of programmable instructions in the memory operable to:
    store a correlation between at least one word with at least one candidate phrase, wherein the at least one candidate phrase includes a first candidate phrase and a second candidate phrase different than the first candidate phrase;
    receive at least one word into the input device;
    identify the at least one candidate phrase correlated to the at least one word;
    replace the at least one word with a selected phrase from the at least one candidate phrase;
    store the selected phrase in a computer readable storage medium;
    receiving and storing a predetermined priority of the first and second candidate phrases relative to one another prior to receiving the step of receiving the at least one word into the input device; and
    displaying the first and second candidate phrases in a sequence in accordance with the predetermined priority.

15. A system to modify entry of text to be stored in a computer-readable storage medium, comprising;
  an input device;
  a display device connected to the input device; and
  a processor connected to the input device and display device and memory, wherein the processor is configured to execute a plurality of programmable instructions stored in the memory, the processor in combination with the plurality of programmable instructions in the memory operable to;
    store a correlation between at least one word with at least one candidate phrase, wherein the at least one candidate phrase includes a first plurality of candidate phrases and a second plurality of candidate phrases different than the first plurality of candidate phrases;
    storing one of the first and second plurality of candidate phrases in correlation to each of a list of potential user identifications;
    receiving the identification of the user;
    comparing the identification of the user to the list of potential user identifications;
    identifying one of the first and second plurality of candidate phrases correlated to the identification of the user; and
    displaying one of the first and second plurality of candidate phrases correlated to the identification of the user.

16. The system of claim 15, wherein the identification of the user includes one of group comprising: an employee identification, an employee certification, a customer identification, and a representation of a nature of a service call.

17. A system to modify entry of text to be stored in a computer-readable storage medium, comprising:
  a means for inputting;
  a means for displaying;
  a means for storing entry of text; and
  a processor connected in communication with the means for inputting and the means for displaying, the means for storing entry of text, and a memory, wherein the processor is configured to execute a plurality of programmable instructions to:
    store a correlation between at least one word with at least one candidate phrase, wherein the at least one candidate phrase includes a first plurality of candidate phrases and a second plurality of candidate phrases different than the first plurality of candidate phrases;
    receive at least one word via the means for inputting;
    identify the at least one candidate phrase correlated to the at least one word;
    replace the at least one word with a selected phrase from the at least one candidate phrase;
    store the selected phrase in the means for storing text;
    store one of first and the second plurality of candidate phrases in correlation to each of a list of potential user identifications;
    receive the identification of the user;
    compare the identification of the user to the list of potential user identifications;
    identify one of the first and second plurality of candidate phrases correlated to the identification of the user; and
    display one of the first and second plurality of candidate phrases correlated to the identification of the user in the means for displaying.

* * * * *